Figure 1:
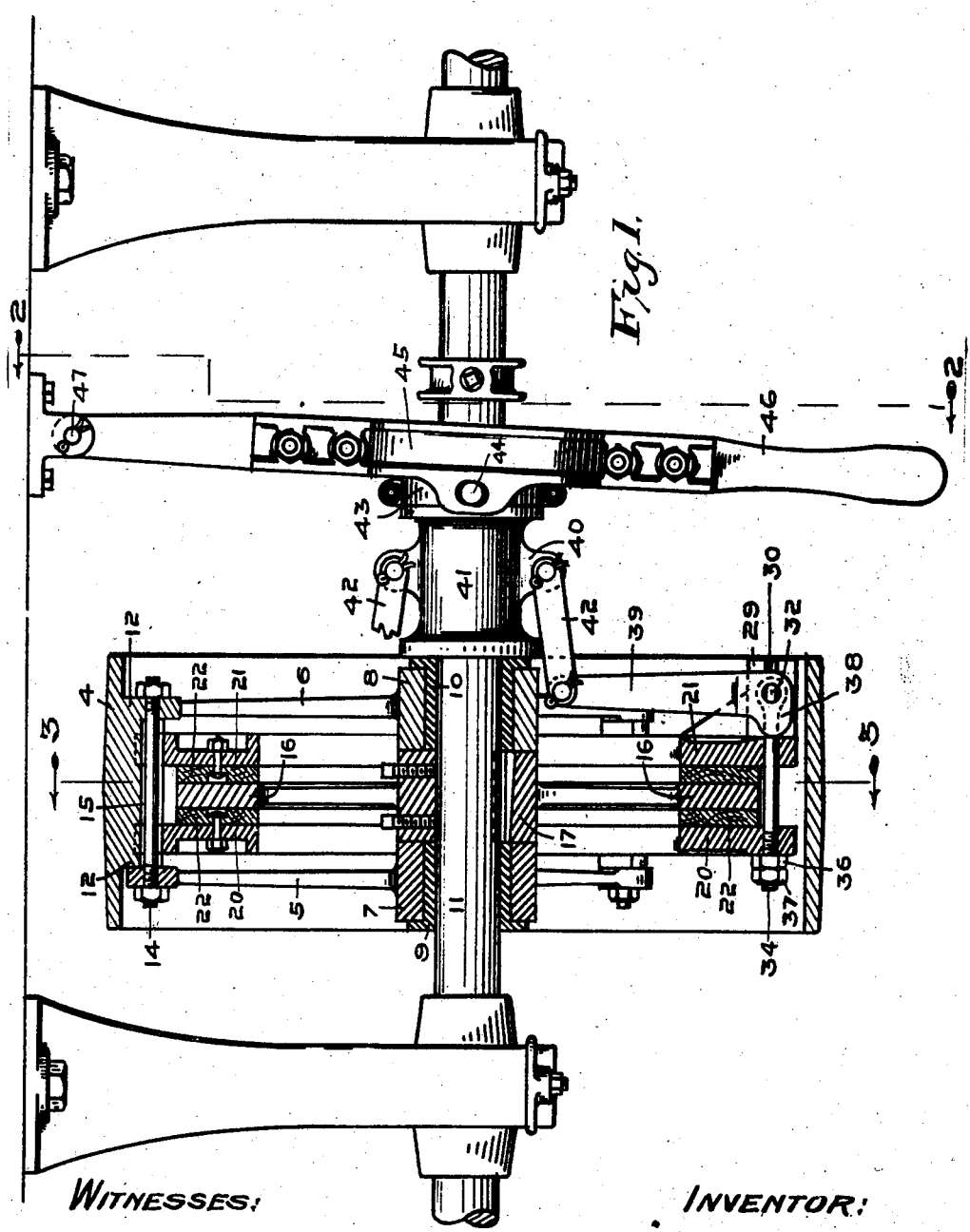

No. 874,954. PATENTED DEC. 31, 1907.
L. H. GEISENDORFF.
FRICTION CLUTCH PULLEY.
APPLICATION FILED DEC. 26, 1906.

2 SHEETS—SHEET 1.

WITNESSES:
L. B. Woerner.
F. C. Dynes.

INVENTOR:
Lee H. Geisendorff,
By Minturn & Woerner,
Attorneys.

No. 874,954.  
PATENTED DEC. 31, 1907.  
L. H. GEISENDORFF.  
FRICTION CLUTCH PULLEY.  
APPLICATION FILED DEC. 26, 1906.  
2 SHEETS—SHEET 2.
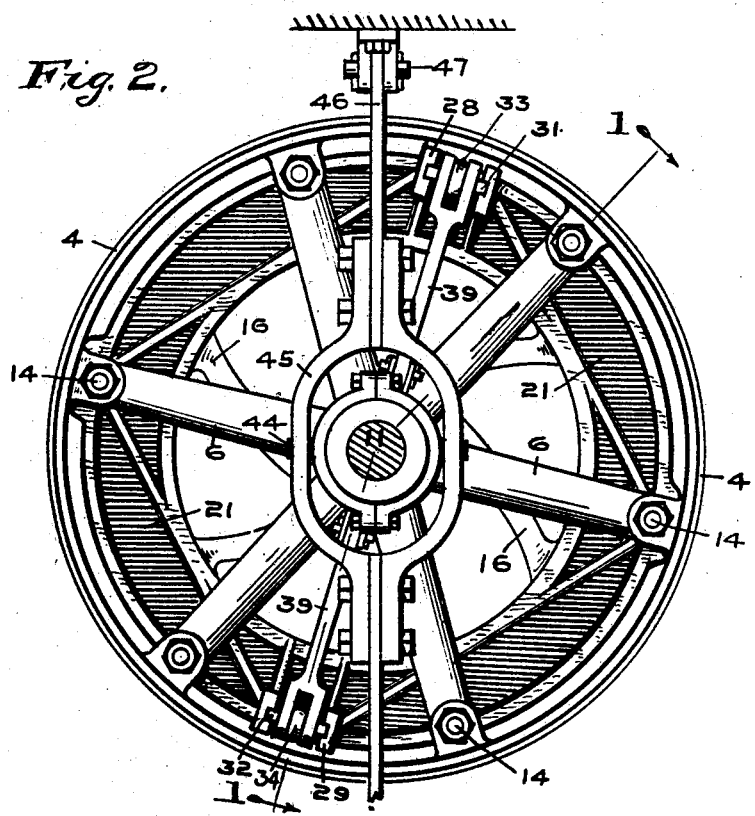
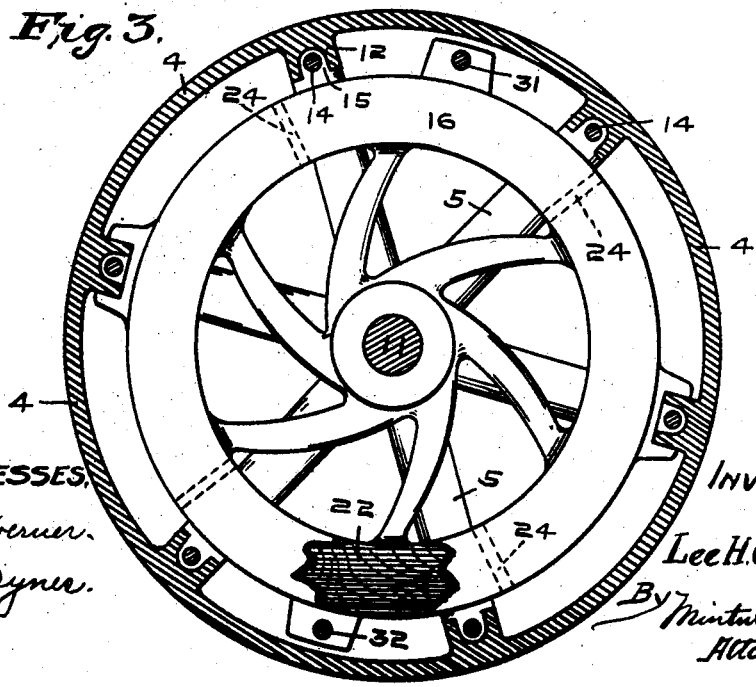
WITNESSES:  
L. B. Werner.  
F. C. Dynes.
INVENTOR:  
Lee H. Geisendorff.  
By Minturn & Werner  
Attorneys.

UNITED STATES PATENT OFFICE.

LEE H. GEISENDORFF, OF INDIANAPOLIS, INDIANA.

FRICTION-CLUTCH PULLEY.

No. 874,954.  Specification of Letters Patent.  Patented Dec. 31, 1907.

Application filed December 26, 1906. Serial No. 349,406.

*To all whom it may concern:*

Be it known that I, LEE H. GEISENDORFF, a citizen of the United States, residing at Indianapolis, in the county of Marion and State of Indiana, have invented certain new and useful Improvements in Friction-Clutch Pulleys, of which the following is a specification.

This invention relates to improvements in friction-clutch pulleys, and the object of the invention is to provide a friction-clutch wherein a fixed friction or grip wheel and the clutch mechanism operating therewith, will be assembled within an outer belt pulley so that the stresses on the friction wheel will maintain the entire structure in true position on its shaft.

The object also is to provide continuous instead of split friction plates, in order to better maintain the accurate adjustment of the device, and to provide removable pulley arms to facilitate access to its interior parts, and to construct a clutch-pulley which will be simple, durable, and effective in its operation.

I accomplish the objects of my invention by the mechanism illustrated in the accompanying drawings, in which—

Figure 1 is a view in side elevation of the related parts of my pulley with the pulley itself shown in section on the line 1—1 of Fig. 2; Fig. 2 is a vertical section taken on the line 2—2 of Fig. 1, and Fig. 3 is a vertical section on the line 3—3 of Fig. 1, the several views being shown looking in the direction of the arrows.

Like characters of reference indicate like parts throughout the several views of the drawings.

4 is the belt- or main driving pulley, which 
has the double arms 5 and 6, and hubs 7 and 8, which latter are bored to receive the bushings 9 and 10, preferably of brass. The hubs fit their respective bushings with a tight fit, but the bushings turn freely upon the main shaft lever. To obviate the necessity for splitting or constructing the pulley 4 in halves, I form the arms 5 separately of the pulley 4 so as to permit of the lateral removal of said arms and their integral hub 7.
The arms 6 and hub 8 are integral parts of each other and of the pulley 4, and extending inwardly from the junction of these arms with their rim, transversely of the latter, are the ribs or flanges 12, the abrupt ends of which, opposite arms 6, form shoulders against which the arms 5 are bolted.

14 are the bolts for securing the arms 5 to the pulley. They pass through suitable holes near the ends of the arms 6, and to save labor and expense in construction, the flanges 12 are each provided with a longitudinal channel 15, of ample dimensions to allow the bolt to pass through it without contact or interference with the bottom or sides of the channel.

Inclosed between the arms 5 and 6, of the pulley 4, and situated concentrically with the shaft 11, is the fixed friction or grip wheel 16, having the hub 17 securely fastened by keys or set screws or both to the shaft 11. The ends of this hub are faced accurately to form bearings against the hubs 7 and 8, and the sides of the friction rim 16 of this friction wheel are turned true to form friction or gripping surfaces. The belt pulley 4 is held against longitudinal movement of the shaft 11 by the hub 17 of the friction wheel 16.

The clamping rings 20 and 21 are situated on opposite sides of the friction-rim of the wheel 16. They are notched at their edges to receive the flanges 12, whereby the rings are made to move in unison with the pulley 4. Bolted to the sides of the rings adjacent to the rim 16, are the friction plates 22, preferably of wood, which need not extend all of the way around, but may consist of segments located at diametrically opposite portions of the friction-rim 16 between radial ribs 24 integrally formed on the said friction-rim 16, (their positions being shown by the dotted lines, in Fig. 3), which help to hold the plates 22 in place on their respective rings. At the middles of these friction plates 22, at two diametrically opposite places of the outer face of the ring 21, are the two pairs, 28 and 29, of parallel plates. The two plates of each pair have grooves 30, on their adjacent sides, parallel with the shaft 11, to receive the flattened ends of the fulcrum pins 31 and 32. These pins 31 and 32 pass through the eyes of respective eye-bolts 33 and 34. Both of these eye-bolts pass through holes in the rings 20 and 21, and have the nuts 36 on their threaded ends, to limit the longitudinal movement of the bolts, and 37 are jam nuts to hold the given positions of the nuts 36.

39 are levers having bifurcated ends to receive the eyes of the respective eye-bolts 33 and 34. These bifurcated ends are provided with the cams 38, and they are also perforated to receive the ends of the respective pins 31 and 32. By moving the cam-levers 39 into the position shown in Fig. 1, the cam will partially withdraw the eye-bolts from the rings 20 and 21, thereby drawing the rings together and clamping the wooden plates 22 tightly against the rim of the wheel 16. The grooves 30 in the plates 28 and 29, act as guides for the pins 31 and 32, while permitting of their movement along said grooves.

The cam levers 39 have the free or power ends of their arms directed inwardly and radially toward the axis of the shaft 11, and are connected at said power ends to the radially-extending lugs 40, formed integral on the clutch-sleeve 41, by their connecting links 42.

The clutch sleeve 41 is mounted on the shaft 11 in a manner to permit it to turn and also to slide longitudinally thereof, and the sleeve has an annular groove to receive a split collar 43. The collar 43 has the trunnions 44 to enter holes in the yoke 45 forming a part of a lever 46. One end of this lever is used as a handle, and the other end is fulcrumed at a fixed point 47, whereby, by moving the lever, the clutch-sleeve 41 will be correspondingly moved longitudinally of the shaft 11, and the cam levers 39 will be moved inwardly or outwardly of the pulley 4 to cause the friction plates to be moved either into or out of engagement.

The cams 38 are all alike in form, and are integral with the cams 39, and the said cams are each constructed to contact with the exterior side of the friction ring 21, simultaneously to draw said friction-rings 20 and 21 toward each other to clamp the friction-rim 18, of the wheel 16, and cause the belt pulley 4 to be rotated along with the friction wheel 16.

By removing the arms 5, the friction rings 20 and 21 and friction wheel 16, may be introduced into the pulley without splitting them, which insures greater strength and will keep the parts from displacement and spreading by centrifugal action.

The operation of my device is so simple that further description is unnecessary.

Having thus fully described my invention, what I claim as new and wish to secure by Letters Patent of the United States is this—

1. In a clutch-pulley, a loosely mounted belt pulley having one integral and one removable set of radial arms spaced apart from each other, a fixed friction wheel mounted inside the belt pulley between the two sets of arms, clutch means for clamping the belt pulley to the friction wheel, and means for connecting the removable set of arms to the belt pulley comprising flanges on the inside of the rim of the belt pulley extending transversely from the junctions of the integral arms, said flanges having longitudinal grooves and terminating with abrupt ends to form bearing shoulders for the ends of the removable arms and bolts passing through the corresponding arms of both sets and through the longitudinal groove in the flange between the two arms being bolted.

2. The combination with a shaft, of a belt pulley loosely mounted thereon, said pulley having two sets of parallel arms spaced apart from each other, one set being removably secured to the pulley, a friction wheel mounted in a fixed manner on said shaft between the two sets of arms of the loosely mounted belt pulley, a pair of clamping rings one on each side of the friction wheel, said rings carried by the belt pulley, friction plates carried by the clamping rings, a pair of eye-bolts passing through the clamping rings at diametrically opposite points of said rings, plate extensions from one of the rings in pairs inclosing the eye of each eye-bolt, fulcrum pins carried by the eyes of said eye-bolts grooves in said plates parallel with the eye-bolts in which the ends of the fulcrum pins are seated, levers having bifurcated cam shaped ends embracing said eye-bolts and fulcrumed on said fulcrum pins, and means for moving the cam levers toward and from the belt pulley to move the clamping rings toward or from the friction wheel.

In witness whereof, I have hereunto set my hand and seal at Indianapolis, Indiana, this 19th day of December, A. D. one thousand nine hundred and six.

LEE H. GEISENDORFF. [L. s.]

Witnesses:
J. A. MINTURN,
F. W. WOERNER.